United States Patent
Clancy et al.

(10) Patent No.: US 8,612,690 B2
(45) Date of Patent: Dec. 17, 2013

(54) METHOD FOR FILTERING TRAFFIC TO A PHYSICALLY-TAGGED DATA CACHE

(75) Inventors: Robert D. Clancy, Cary, NC (US); James Norris Dieffenderfer, Apex, NC (US); Thomas Philip Speier, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 13/426,647

(22) Filed: Mar. 22, 2012

(65) Prior Publication Data

US 2013/0185473 A1    Jul. 18, 2013

Related U.S. Application Data

(60) Provisional application No. 61/587,140, filed on Jan. 17, 2012.

(51) Int. Cl.
*G06F 12/10* (2006.01)
*G06F 7/04* (2006.01)

(52) U.S. Cl.
USPC ............... 711/140; 711/206; 711/E21.045

(58) Field of Classification Search
USPC ............... 711/140, 206, E12.044, E12.045
See application file for complete search history.

(56) References Cited

U.S. PATENT DOCUMENTS

| | | | |
|---|---|---|---|
| 5,379,396 A | 1/1995 | Gochman et al. | |
| 6,253,301 B1 | 6/2001 | Razdan et al. | |
| 6,976,117 B2 | 12/2005 | Clark et al. | |
| 7,451,271 B2 | 11/2008 | OConnor | |
| 7,657,708 B2 | 2/2010 | Knoth et al. | |
| 2005/0050277 A1* | 3/2005 | Shen et al. | 711/118 |
| 2011/0161595 A1 | 6/2011 | Fang et al. | |

FOREIGN PATENT DOCUMENTS

| | | | | |
|---|---|---|---|---|
| GB | 2307319 | * | 5/1997 | G06F 12/06 |
| GB | 2307319 A | | 5/1997 | |

OTHER PUBLICATIONS

International Search Report and Written Opinion—PCT/US2013/021822—ISA/EPO—Jun. 12, 2013.

* cited by examiner

*Primary Examiner* — Hal Schnee
(74) *Attorney, Agent, or Firm* — Nicholas J. Pauley; Peter Michael Kamarchik; Joseph Agusta

(57) ABSTRACT

Embodiments of a data cache are disclosed that substantially decrease a number of accesses to a physically-tagged tag array of the data cache are provided. In general, the data cache includes a data array that stores data elements, a physically-tagged tag array, and a virtually-tagged tag array. In one embodiment, the virtually-tagged tag array receives a virtual address. If there is a match for the virtual address in the virtually-tagged tag array, the virtually-tagged tag array outputs, to the data array, a way stored in the virtually-tagged tag array for the virtual address. In addition, in one embodiment, the virtually-tagged tag array disables the physically-tagged tag array. Using the way output by the virtually-tagged tag array, a desired data element in the data array is addressed.

24 Claims, 3 Drawing Sheets

|  | WAY 0 | WAY 1 | WAY 2 | ... | WAY N-1 |
|---|---|---|---|---|---|
| SET 0 | | | | | |
| SET 1 | | | | | |
| SET 2 | | | | | |
| SET 3 | | | | | |
| SET 4 | | | | ... | |
| SET 5 | | | | | |
| ⋮ | ⋮ | ⋮ | ⋮ | ⋮ | ⋮ |
| SET M-1 | | | | | |

METHOD FOR FILTERING TRAFFIC TO A PHYSICALLY-TAGGED DATA CACHE

PRIORITY CLAIM

The present application claims priority to U.S. Patent Provisional Application Ser. No. 61/587,140 filed on Jan. 17, 2012 and entitled METHOD FOR FILTERING TRAFFIC TO A PHYSICALLY-TAGGED DATA CACHE, which is incorporated herein by reference in its entirety.

FIELD OF THE DISCLOSURE

The present disclosure relates to a data cache.

BACKGROUND

Many modern microprocessors utilize virtually-addressed cache. In order to use virtually-addressed cache, translation of virtual addresses to corresponding physical addresses is typically performed. This translation essentially adds another stage to the instruction pipeline, which in turn decreases the performance of the microprocessor.

In addition, in response to increasing demand for longer battery life for mobile devices, power profiles of microprocessors have become increasingly critical. One of the largest components of power utilization within a storage unit is searching a physically-tagged tag array for each operation as operations move down the instruction pipeline. This search of the physically-tatted tag array is necessary to be able to retire loads directly from the instruction pipeline such that the average load-use penalty is as low as possible. The problem is that the power associated with accessing the physically-tagged tag array, which is typically a large structure, is quite significant.

As such, there is a need for a data cache and a method of operation thereof that enables the instruction pipeline to achieve the same performance while limiting the number of accesses to the physically-tagged tag array.

SUMMARY OF THE DISCLOSURE

Embodiments of a data cache are disclosed that substantially decrease a number of accesses to a physically-tagged tag array of the data cache. In general, the data cache includes a data array that stores data elements, a physically-tagged tag array, and a virtually-tagged tag array. In one embodiment, the virtually-tagged tag array receives a virtual address. If there is a match for the virtual address in the virtually-tagged tag array, the virtually-tagged tag array outputs, to the data array, a way stored in the virtually-tagged tag array for the virtual address. In addition, in one embodiment, the virtually-tagged tag array disables the physically-tagged tag array. In this manner, the way is obtained without accessing the physically-tagged tag array. Using the way output by the virtually-tagged tag array, a desired data element in the data array is addressed. In contrast, if there is not a match for the virtual address in the virtually-tagged tag array, a physical address obtained from a translation of the virtual address to a physical address is provided to the physically-tagged tag array, and the physically-tagged tag array outputs a way stored in the physically-tagged tag array for the physical address. A desired data element in the data array is addressed with an index obtained from the virtual address and the way obtained from the virtually-tagged tag array.

By obtaining the way from the virtually-tagged tag array when there is a match between the virtual address and a tag in the virtually-tagged tag array, the way is obtained without accessing the physically-tagged tag array. As a result, performance is improved by effectively reducing a number of stages in the data cache. In addition, in the embodiment where the physically-tagged tag array is disabled when there is a match between the virtual address and a tag in the virtually-tagged tag array, power consumption of the data cache is reduced.

BRIEF DESCRIPTION OF THE FIGURES

FIG. 2 illustrates one example of the data array of the data cache of FIG. 1 wherein the data array is implemented as a set-associative memory structure according to one embodiment of the present disclosure.

DETAILED DESCRIPTION

Figure 1:
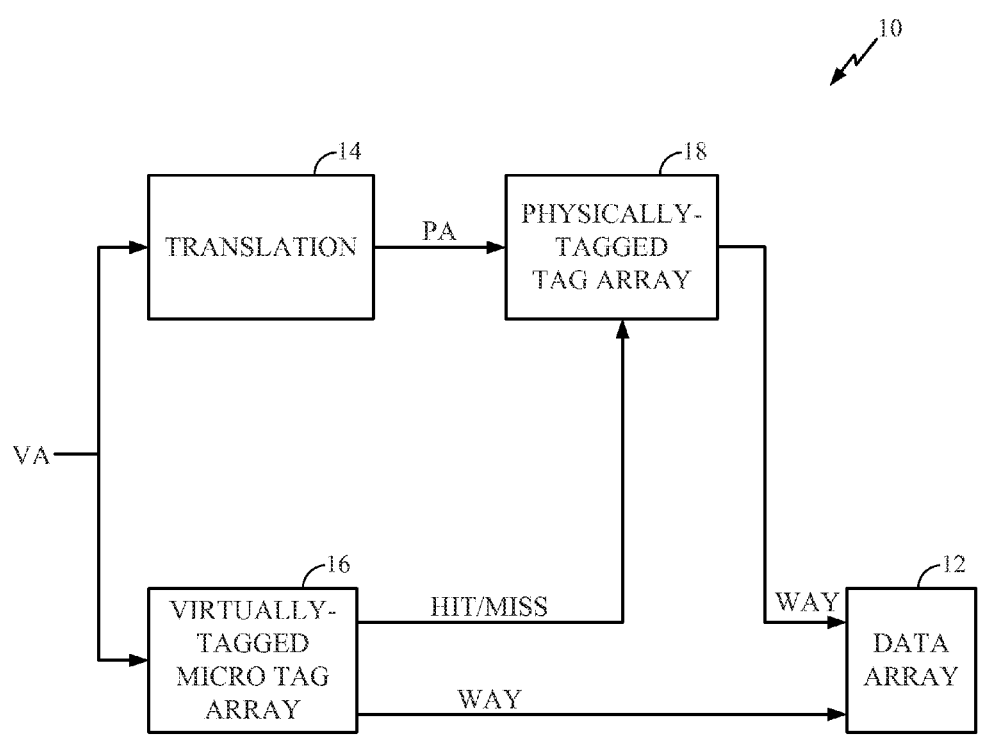
FIG. 1 illustrates a data cache that includes a virtually-tagged tag array according to one embodiment of the present disclosure.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of a data cache are disclosed that substantially decrease a number of accesses to a physically-tagged tag array of the data cache are provided. As discussed below, by decreasing the number of accesses to the physically-tagged tag array, performance of the data cache is increased while power consumption of the data cache is reduced. FIG. 1 illustrates one embodiment of a data cache 10 according to the present disclosure. In general, the data cache 10 includes a data array 12, translation circuitry 14, a virtually-tagged micro tag array 16, and a physically-tagged tag array 18 connected as shown. The data array 12 stores a number of data elements (e.g., a number of 64 byte data elements). Further, the data array 12 is set associative such that, for each index or set for the data array 12, the data array 12 includes a number of "ways" each storing a separate data element, as illustrated in FIG. 2. Thus, for each index for the data array 12, the data array 12 stores N−1 data elements, where N−1 is the number of was in the data array 12. For example, if the data array 12 is four-way set associative, the data array 12 includes four ways each storing a separate data element for each index or set into the data array 12. Thus, both an index and a way are used to address a particular data element in the data array 12.

The translation circuitry 14 operates to translate a virtual address input to the data cache 10 into a physical address using a known virtual address to physical address translation technique. The virtually-tagged micro tag array 16 may be implemented using any desired memory structure such as, for example, a set-associative memory structure, a fully associative memory structure, or a direct mapped memory structure. A size of the virtually-tagged micro tag array 16 is preferably substantially smaller than that of the physically-tagged tag array 18. However, the size of the virtually-tagged micro tag array 16 is not limited thereto. For example, the size of the virtually-tagged micro tag array 16 may alternatively be equal to that of the physically-tagged tag array 18. The virtually-tagged micro tag array 16 stores way values for a number of virtual tags. The physically-tagged tag array 18 may also be implemented using any desired memory structure such as, for example, a set-associative memory structure, a fully associative memory structure, or a direct mapped memory structure. The physically-tagged tag array 18 stores way values for a number of physical tags.

In operation, when a data element, or a portion of a data element, is written to the data array 12, a corresponding way value is stored in the virtually-tagged micro tag array 16 in association with a corresponding virtual tag. In a similar manner, the corresponding way value is stored in the physically-tagged tag array 18 in association with a corresponding physical tag. The exact manner in which the way value is stored in the virtually-tagged micro tag array 16 and the physically-tagged tag array 18 depends on the structures of the virtually-tagged micro tag array 16 and the physically-tagged tag array 18. This process is repeated as new data elements, or portions of data elements, are written to the data array 12.

When a data element is to be read out of the data cache 10 or otherwise addressed, the data cache 10 receives a virtual address (VA) from, for example, an instruction pipeline of a microprocessor. In response to receiving the virtual address, the translation circuitry 14 translates the virtual address to a physical address using a known virtual address to physical address conversion technique. At the same time that the translation circuitry 14 is performing the translation, the virtually-tagged micro tag array 16 determines whether there is a match for the virtual address in the virtually-tagged micro tag array 16. The manner in which the virtually-tagged micro tag array 16 determines whether there is a match for the virtual address in the virtually-tagged micro tag array 16 will vary depending on the particular implementation. For instance, if the virtually-tagged micro tag array 16 is implemented as a set-associative memory structure such as, for example, a Content Addressable Memory (CAM) structure, the virtual address, or at least a virtual tag contained in the virtual address, is simultaneously compared to a number of virtual tags stored in the virtually-tagged micro tag array 16 to determine whether there is a match for the virtual address in the virtually-tagged micro tag array 16.

As another example, if the virtually-tagged micro tag array 16 is implemented as a set-associative memory structure, the virtually-tagged micro tag array 16 may include a number of sets or indices and, for each set or index, a number of ways. Preferably, the number of ways in the virtually-tagged micro tag array 16 is less than the number of ways in the data array 12. In this example, the indexes for the virtually-tagged micro tag array 16 are the same as those for the data array 12, and each data element in the virtually-tagged micro tag array 16 (i.e., each index and way combination) is configured to store a virtual tag and an associated way. To determine whether there is a match for the virtual address, an index contained in the virtual address is used to index the virtually-tagged micro tag array 16, and the ways for the index in the virtually-tagged micro tag array 16 are searched to determine whether the virtual tag for any of those ways matches the virtual tag from the virtual address. If so, there is a match for the virtual address. Note that the aforementioned examples for the virtually-tagged micro tag array 16 are provided for illustration purposes only and are not intended to limit the scope of the present disclosure.

If there is no match for the virtual address in the virtually-tagged micro tag array 16, the virtually-tagged micro tag array 16 outputs a miss indicator, which enables the physically-tagged tag array 18. In response, the physically-tagged tag array 18 processes the physical address from the translation circuitry 14 to output a corresponding way to the data array 12. The manner in which the physically-tagged tag array 18 processes the physical address to output the corresponding way will vary depending on the particular implementation. For example, if the physically-tagged tag array 18 is implemented as a fully associative memory structure (e.g., a CAM structure), the physically-tagged tag array 18 stores a number of physical tags and corresponding ways. The physical tags in the physically-tagged tag array 18 are then simultaneously compared to a physical tag included in the physical address in order to output the way value stored in association with the physical tag in the physically-tagged tag array 18. As another example, the physically-tagged tag array 18 may be implemented as a set-associative memory structure having a number of sets, or indices, and a number of ways for each set or index. The indices for the physically-tagged tag array 18 are the same as the indices for the data array 12, and each data element (i.e., each index and way combination) in the physically-tagged tag array 18 is configured to store a physical tag and a corresponding way. An index contained in the physical address is used to index the physically-tagged tag array 18, and the ways for the index in the physically-tagged tag array 18 are searched for a physical tag that matches the physical tag from the physical address. The way value stored in association with the matching physical tag is then output by the physically-tagged tag array 18. Note that the aforementioned examples for the physically-tagged tag array 18 are provided for illustration purposes only and are not intended to limit the scope of the present disclosure.

In response to receiving the way from the physically-tagged tag array 18, the data array 12 outputs the appropriate data element. More specifically, in one embodiment, data elements in the data array 12 are addressed using an index included in the virtual address and a way obtained from either the virtually-tagged micro tag array 16 or the physically-tagged tag array 18. Thus, using the index from the virtual address and the way output by the physically-tagged tag array 18, the data array 12 outputs the data element addressed by the index and the way.

If there is a match for the virtual address in the virtually-tagged micro tag array 16, in this embodiment, the virtually-tagged micro tag array 16 outputs a hit indicator, which disables the physically-tagged tag array 18. In addition, the virtually-tagged micro tag array 16 outputs the way for the virtual address to the data array 12. Again, the way output by the virtually-tagged micro tag array 16 is a way value stored in the virtually-tagged micro tag array 16 in association with the virtual tag that matches the virtual address. In response to receiving the way from the virtually-tagged micro tag array 16, the data array 12 outputs the appropriate data element. More specifically, in one embodiment, data elements in the data array 12 are addressed using an index included in the virtual address and a way obtained from either the virtually-tagged micro tag array 16 or the physically-tagged tag array 18. Thus, using the index from the virtual address and the way output by the virtually-tagged micro tag array 16 for the virtual address, the data array 12 outputs the data element addressed by the index and the way.

Notably, the virtually-tagged micro tag array 16 improves the performance of the data cache 10 and reduces power consumption of the data cache 10 by reducing the number of accesses to the physically-tagged tag array 18, which is typically a large structure. More specifically, if there is a hit for the virtual address in the virtually-tagged micro tag array 16, the way is obtained without accessing the physically-tagged tag array 18. As a result, the number of stages in the data cache 10 is effectively reduced to two stages. Specifically, when there is a hit in the virtually-tagged micro tag array 16, the number of stages in the data cache 10 is two (i.e., the virtually-tagged micro tag array 16 and the data array 12). In contrast, traditional data caches require three stages, which correspond to the translation circuitry 14, the physically-tagged tag array 18, and the data array 12 that are utilized in the data cache 10 when there is not a hit for the virtual address in the virtually-tagged micro tag array 16. In addition to reducing the number of stages in the data cache 10, a hit in the virtually-tagged micro tag array 16 also saves power that would have otherwise been consumed by the physically-tagged tag array 18.

Two examples of advantages provided by the data cache 10 described herein are: increasing performance and lowering power. Performance is increased by using the way from the virtually-tagged micro tag array 16 to index into the data array 12. Power is reduced by not enabling the physically-tagged tag array 18 when there is a hit in virtually-tagged micro tag array 16. However, it should be noted that, in an alternative embodiment, the physically-tagged tag array 18 may not be disabled When there is a hit in the virtually-tagged micro tag array 16 (e.g., the hit indicator may not be provided to disable the physically-tagged tag array 18). By doing so, power consumption is not reduced by disabling the physically-tagged tag array 18. However, performance would still be improved by providing the way from the virtually-tagged micro tag array 16 to the data array 12, thereby effectively reducing the number of stages of the data cache 10.

The data cache 10 according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 3:
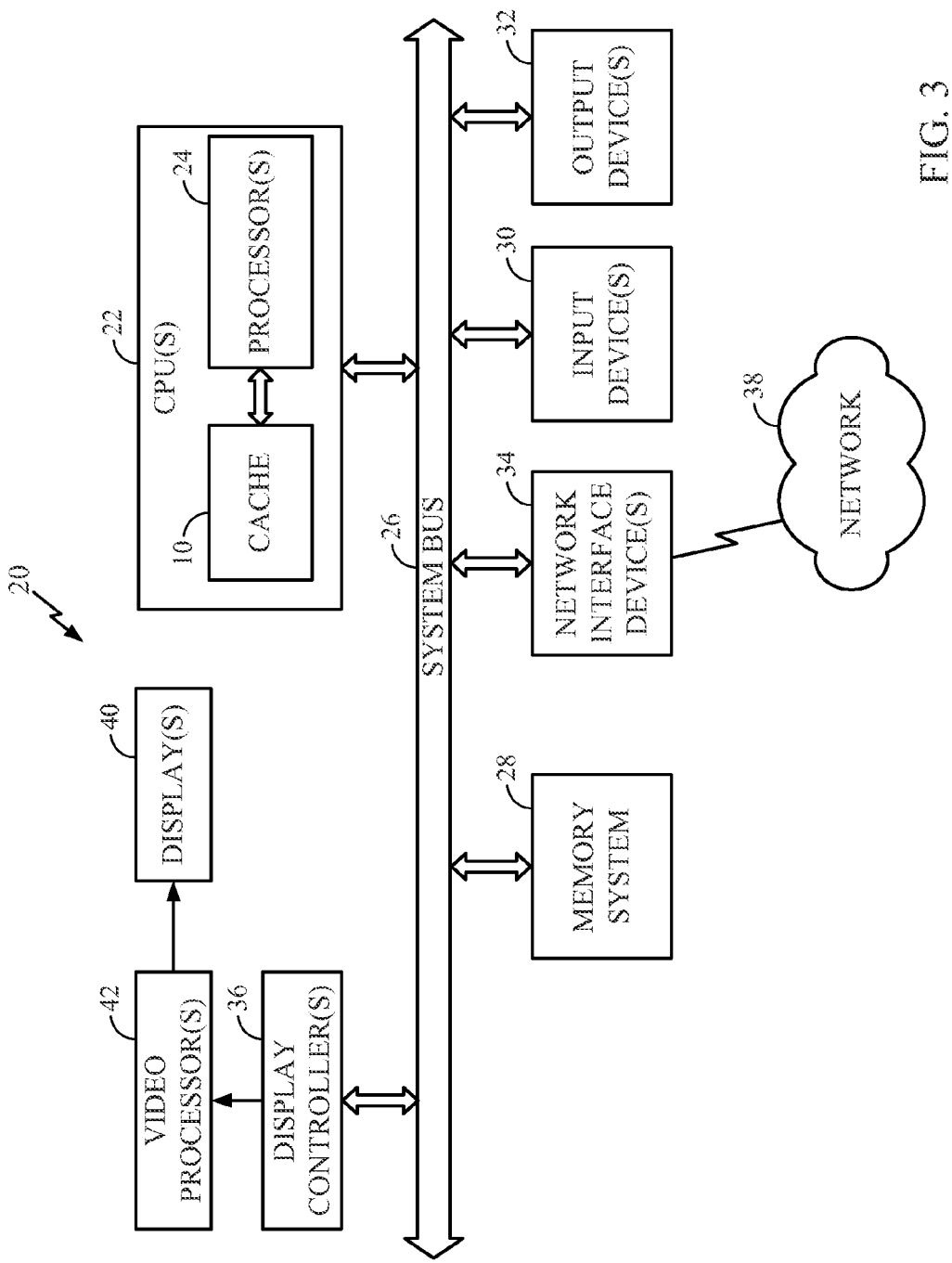
FIG. 3 illustrates one example of a processor-based system that can employ the data cache of FIG. 1.

In this regard, FIG. 3 illustrates an example of a processor-based system 20 that can employ the data cache 10 illustrated in FIG. 1. In this example, the processor-based system 20 includes one or more central processing units (CPUs) 22, each including one or more processors 24. The CPU(s) 22 include the data cache 10 coupled to the processor(s) 24 for rapid access to temporarily stored data. The CPU(s) 22 is coupled to a system bus 26 and can intercouple master devices and slave devices included in the processor-based system 20. As is well known, the CPU(s) 22 communicates with these other devices by exchanging address, control, and data information over the system bus 26. Although not illustrated in FIG. 3, multiple system buses 26 could be provided, wherein each system bus 26 constitutes a different fabric.

Other master and slave devices can be connected to the system bus 26. As illustrated in FIG. 3, these devices can include a memory system 28, one or more input devices 30, one or more output devices 32, one or more network interface devices 34, and one or more display controllers 36, as examples. The input device(s) 30 can include any type of input device, including but not limited to input keys, switches, voice processors, etc. The output device(s) 32 can include any type of output device, including but not limited to audio, video, other visual indicators, etc. The network interface device(s) 34 can be any devices configured to allow exchange of data to and from a network 38. The network 38 can be any type of network, including but not limited to a wired or wireless network, private or public network, a local area network (LAN), a wide local area network (WLAN), and the Internet. The network interface device(s) 34 can be configured to support any type of communication protocol desired.

The CPU 22 may also be configured to access the display controller(s) 36 over the system bus 26 to control information sent to one or more displays 40. The display controller(s) 36 sends information to the display(s) 40 to be displayed via one or more video processors 42, which process the information to be displayed into a format suitable for the display(s) 40. The display(s) 40 can include any type of display, including but not limited to a cathode may tube (CRT), a liquid crystal display (LCD a plasma display, etc.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A data cache, comprising:
    a data array;
    a physically-tagged tag array; and
    a virtually-tagged tag array configured to:
        receive a virtual address;
        determine whether there is a match for the virtual address in the virtually-tagged tag array; and
    if there is a match for the virtual address in the virtually-tagged tag array, output a way stored by the virtually-tagged tag array for the virtual address to the data array; and
    if there is not a match for the virtual address in the virtually-tagged tag array, enable a search of the physically-tagged tag array using a physical address that corresponds to the virtual address.

2. The data cache of claim 1 further comprising:
    translation circuitry configured to translate the virtual address into the physical address and output the physical address to the physically-tagged tag array while the virtually-tagged tag array determines whether there is a match for the virtual address in the virtually-tagged tag array.

3. The data cache of claim 2 wherein, if there is a match for the virtual address in the virtually-tagged tag array, the physically-tagged tag array is disabled such that a search of the physically-tagged tag array using the physical address from the translation circuitry is not performed.

4. The data cache of claim 1 wherein the virtually-tagged tag array is further configured to disable the physically-tagged tag array if there is a match for the virtual address in the virtually-tagged tag array.

5. The data cache of claim 1 wherein, in order to enable the search of the physically-tagged tag array, the virtually-tagged tag array is configured to output a miss to the physically-tagged tag array if there is not a match for the virtual address in the virginally-tagged tag array.

6. The data cache of claim 5 wherein, in response to the miss from the virtually-tagged tag array, the physically-tagged tag array is configured to:
    determine whether there is a match for the physical address in the physically-tagged tag array; and
    if there is a match, output a way stored by the physically-tagged tag array for the physical address.

7. The data cache of claim 6 wherein the data array is configured to:
    receive the way from the virtually-tagged tag array if there is a match for the virtual address in the virtually-tagged tag array and receive the way from the physically-tagged tag array if there is not a match for the virtual address in the virtually-tagged tag array but there is a match for the physical address in the physically-tagged tag array; and
    in response to receiving the way, output a data element based on the way.

8. The data cache of claim 7 wherein the data array is set associative and, in order to output the data element, the data array outputs a data element addressed by an index obtained from the virtual address and the way.

9. The data cache of claim 1 wherein a size of the virtually-tagged array is less than a size of the physically-tagged tag array.

10. The data cache of claim 1 wherein a size of the virtually-tagged tag array is equal to a size of the physically-tagged tag array.

11. The data cache of claim 1 wherein the virtually-tagged tag array has a structure selected from a group consisting of: a set associative memory structure, a fully associative memory structure, and a direct mapped memory structure.

12. The data cache of claim 1 wherein, when there is a match for the virtual address in the virtually-tagged tag array, a number of stages of the data cache is reduced to two stages consisting of the virtually-tagged tag array and the data array.

13. The data cache of claim 1 wherein there is a match for the virtual address in the virtually-tagged tag array and, in response to the match, the virtually-tagged tag array outputs the way stored by the virtually-tagged tag array for the virtual address to the data array and disables the physically-tagged tag array.

14. The data cache of claim 1 wherein the data cache is implemented on a semiconductor die.

15. The data cache of claim 1 wherein the data cache is integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

16. A method of operation of a data cache including a data array, a physically-tagged tag array, and a virtually-tagged tag array, comprising:
    receiving a virtual address;
    determining whether there is a match for the virtual address in the virtually-tagged tag array;
    if there is a match for the virtual address in the virtually-tagged tag array, outputting a way stored by the virtually-tagged tag array for the virtual address to the data array; and
    if there is not a match for the virtual address in the virtually-tagged tag array, enabling a search of the physically-tagged tag array using a physical address that corresponds to the virtual address.

17. The method of claim 16 further comprising disabling the physically-tagged tag array if there is a match for the virtual address in the virtually-tagged tag array.

18. The method of claim 17 further comprising:
  translating the virtual address into the physical address; and
  outputting the physical address to the physically-tagged tag array;
  wherein translating the virtual address into the physical address and outputting the physical address to the physically-tagged tag array are performed while determining whether there is a match for the virtual address in the virtually-tagged tag array.

19. The method of claim 16 wherein enabling the search of the physically-tagged tag array comprises outputting a miss to the physically-tagged tag array if there is not a match for the virtual address in the virtually-tagged tag array.

20. The method of claim 19 further comprising, in response to the miss from the virtually-tagged tag array:
  determining whether there is a match for the physical address in the physically-tagged tag array; and
  if there is a match for the physical address in the physically-tagged tag array, outputting a way stored by the physically-tagged tag array for the physical address.

21. The method of claim 20 further comprising:
  receiving, at the data array, the way from the virtually-tagged tag array if there is a match for the virtual address in the virtually-tagged tag array or from the physically-tagged tag array if there is not a match for the virtual address in the virtually-tagged tag array but there is a match for the physical address in the physically-tagged tag array; and
  in response to receiving the way, outputting a data element based on the way.

22. The method of claim 21 wherein the data array is set associative and outputting the data element comprises outputting a data element addressed by an index obtained from the virtual address and the way.

23. A data cache comprising:
  means for determining whether there is a match for a virtual address in a virtually-tagged tag array; and
  if there is a match for the virtual address in the virtually-tagged tag array:
    means for outputting a way stored by the virtually-tagged tag array for the virtual address to a data array of the data cache; and
    means for disabling a physically-tagged tag array of the data cache; and
  if there is not a match for the virtual address in the virtually-tagged tag array:
    means for enabling a search of the physically-tagged tag array using a physical address that corresponds to the virtual address.

24. A non-transitory computer readable medium storing software for instructing a processor to:
  determine whether there is a match for a virtual address in a virtually-tagged tag array of a data cache; and
  if there is a match for the virtual address in the virtually-tagged tag array:
    provide a way stored by the virtually-tagged tag array for the virtual address to a data array of the data cache; and
    disable a physically-tagged tag array of the data cache; and
  if there is not a match for the virtual address in the virtually-tagged tag array:
    enable a search of a physically-tagged tag array of the data cache using a physical address that corresponds to the virtual address.

* * * * *